Aug. 16, 1932.    E. F. PAUL    1,871,554
BROODER ATTACHMENT
Filed March 10, 1930    2 Sheets-Sheet 1
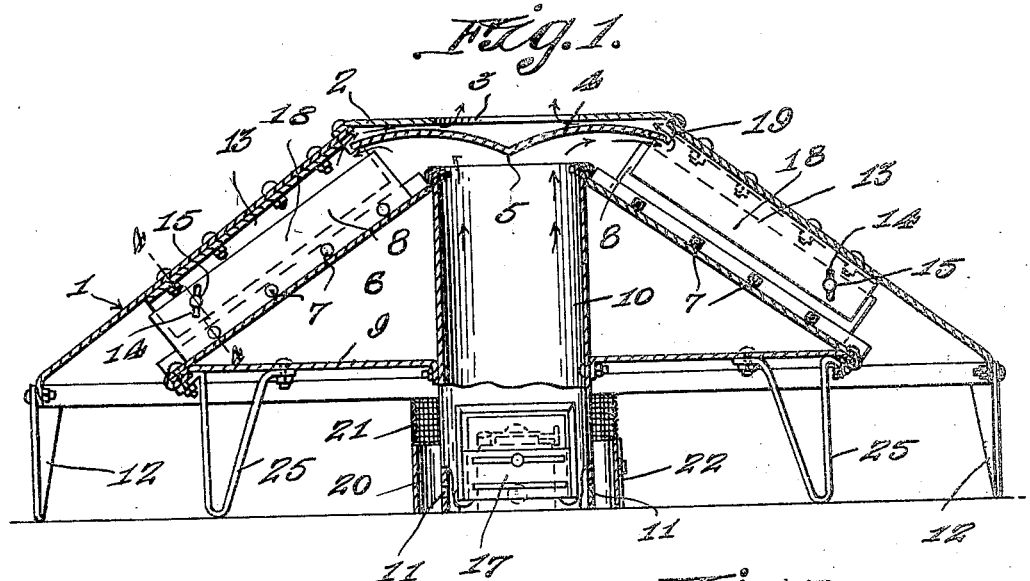
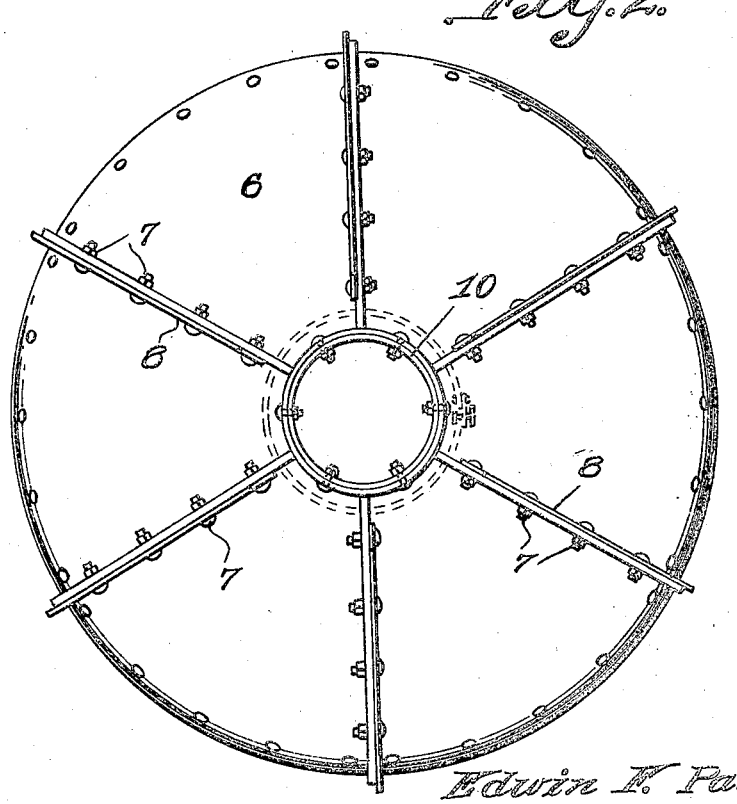

Aug. 16, 1932.  E. F. PAUL  1,871,554
BROODER ATTACHMENT
Filed March 10, 1930    2 Sheets-Sheet 2
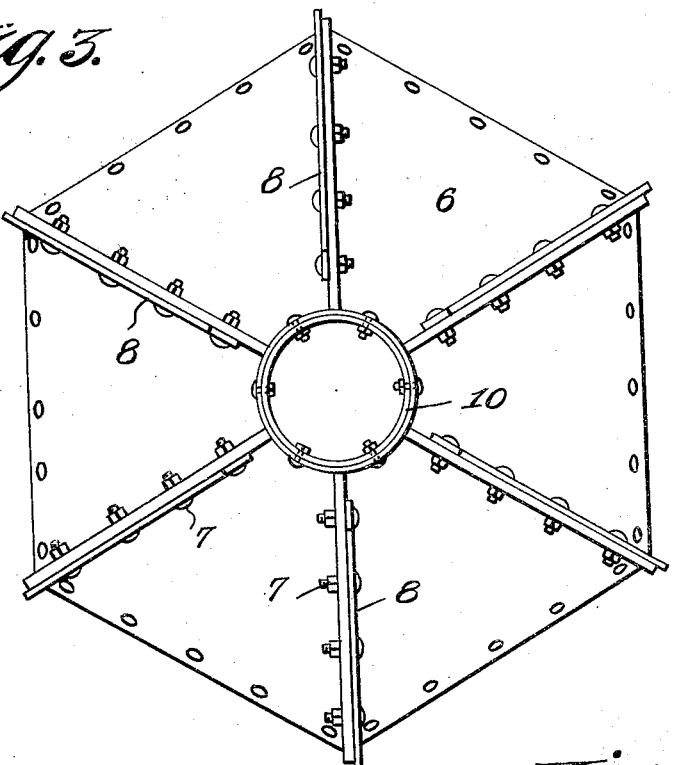
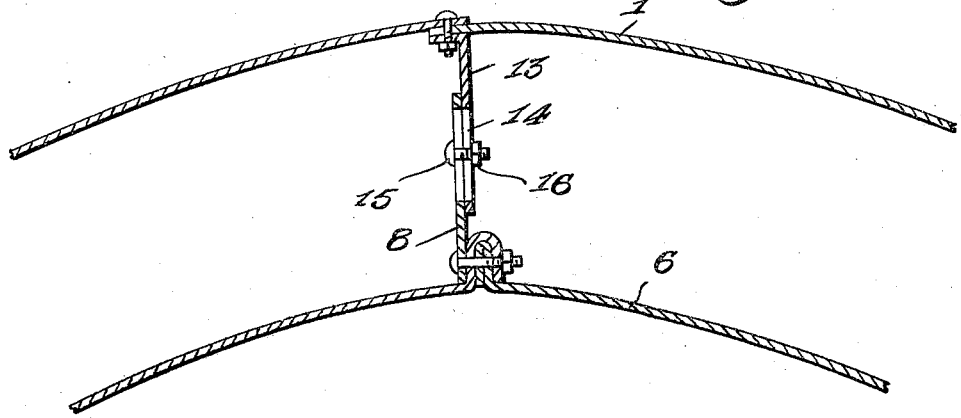

Patented Aug. 16, 1932

1,871,554

UNITED STATES PATENT OFFICE

EDWIN F. PAUL, OF MANCHESTER, KANSAS

BROODER ATTACHMENT

Application filed March 10, 1930. Serial No. 434,745.

My present invention has reference to an improvement in hovers for brooding chicks.

My object is to provide a simple but novel construction of hovers that is provided with means for controlling the heat or temperature therein under all conditions.

A further object is the provision of a hover in which the heat from the stove is properly directed downwardly onto the hovering chicks and the gas or foul air from such heat is permitted an outlet before the heat is brought against or contacts with the chicks, and further wherein the chicks are effectively guarded from direct contact with the stove or heater.

A still further object is the provision of a brooder in which the outer casing or canopy has an outlet opening in the top thereof, a baffle plate directly below the opening, an inner casing which is adjustable with respect to the outer casing or canopy, the said inner casing carrying a chimney whose lower portion is apexed and which lower portion surrounds the stove or heater, together with a guard having an upper reticulated portion that surrounds the projecting end of the chimney which will prevent the chicks from coming into direct contact with either the chimney or the heater and wherein the inner casing is adjustable with respect to the outer casing or canopy and further wherein a continuous circulation of heat and fresh air is produced.

To the attainment of the foregoing and other objects which will present themselves as the nature of the invention is better understood the improvement also resides in certain other novel features of construction, combination and operative association of parts, one satisfactory embodiment of which is disclosed by the accompanying drawings.

In the drawings:

Figure 1 is a vertical central sectional view through the improvement.

Figure 2 is a top plan view of the inner casing.

Figure 3 is a similar view showing a different form of inner casing.

Figure 4 is a sectional view approximately on the line 4—4 of Figure 1.

The outer casing or canopy 1 of the improved brooder comprises a downwardly slanting member. If desired, the member 1 may be constructed of connected sections, and the same may be round, hexagonal or of any other desired shape in plan. The outer casing or canopy 1 has a top plate 2 which is provided with a central opening 3 that affords a gas outlet and below the opening there is arranged in the canopy a baffle plate 4. The baffle plate is in the nature of a disc and is concaved from its edges to the center thereof, so that the said center is pointed downwardly, as at 5.

The inner casing is broadly indicated by the numeral 6. The casing comprises a downwardly slanting member and is made up of segments, as disclosed by Figures 2 and 3 of the drawings. The inner casing 6 is peripherally shaped to correspond with that of the outer casing or canopy 1. The confronting or contacting edges of the slanting top of the inner casing are bent to provide interengaging flanges, and these flanges are connected together by bolts or like elements 7 which also secure to the flanges plates 8. The bottom of the inner casing 6 is closed, as indicated by the numeral 9. The inner casing is formed with a central opening that receives therein and has bolted to both the top and bottom thereof a tubular member that affords a chimney 10. The chimney extends a suitable distance below the bottom plate 9 of the inner casing and the said chimney, adjacent its bottom, is provided with a series of apertures 11.

The outer casing or canopy 1 is suitably supported upon legs 12 and has bolted or otherwise fixed on its inner face plates 13 which are arranged in lapping relation with the plates 8. The lapping plates 8 and 13, adjacent to the lower or outer ends thereof are provided with elevated vertically disposed registering slots 14. Passing through these slots there are bolts 15 which are engaged by suitable nuts 16. By this arrangement it will be apparent that the inner casing 6 may be adjusted toward or away from the outer casing or hood 1. The adjustment of the casing 6 vertically adjusts the chimney 10.

On the floor on which the legs 12 rest I arrange a heater 17. The heater is preferably in the nature of a coal oil burning stove and obviously the heat therefrom will be directed upwardly through the chimney, and contact with the arched portions of the baffle plate to direct the same through the flues 18, afforded between the top of the canopy or casing 1 and the top of the inner casing 6 and will be directed downwardly into the hover and returned through the apertures 11 to the stove or heater 17. Foul gases will be directed through the passage 19 between the top 2 of the outer casing or canopy 1 and through the opening 3 in the said top 2.

While not disclosed by the drawings a flexible curtain may be arranged around the lower periphery of the casing or canopy 1.

Surrounding the lower portion of the chimney 10 there is a cylindrical guard. The lower portion 20 of this guard is preferably in the nature of a non-reticulated tube but the outer portion 21 is of wire mesh or like reticulated material. The lower portion 20 is provided with an opening that is normally closed by a door 22 whereby access may be obtained to the stove 17 when the hover is raised above the stove.

By reference to Figure 1 of the drawings it will be seen that the base 9 of the inner casing 6 is elevated above the bottom or lower edge of the canopy. This is desirable if not an essential feature of the improvement, as such arrangement will draw the air downwardly and inwardly throughout the hovering chamber and will eliminate the necessity of a curtain on the outer edge of the canopy for the perfect operation of the device although as previously stated a curtain may be used. Also the base 9 of the casing 6 may be supported upon legs 25, as disclosed by Figure 1 of the drawings.

With my improvement the heated air, in the hovering chamber, is at an even temperature throughout, that is to say, if the temperature registers 95° in one place in the hovering chamber it will likewise register 95° at any other place in the said chamber. Any desired type of heaters may be employed, and in the event where a coal burner is used the canopy can be supported directly therefrom and in this instance the smoke outlet from the stove will be arranged to one side of the center of the top of the canopy and also in this instance the ventilating openings may be dispensed with as no gas can escape from the inside of the stove, the said gas being carried up and out through the stove pipe.

If desired the chimney may be lined with asbestos and the said chimney may be round, square or hexagonal and larger at the top than the bottom or larger at the bottom than the top in accordance with the heater employed. Also if desired the downwardly slanting member of the canopy may be flattened at the top to correspond with certain type of hovers which may be used and the lower plate 9 may be inclined instead of straight as disclosed by the drawings. Also of desired, the bottom of the wall 9 may be brought downwardly inside of the chick guard, thereby bringing the dead air space to a lower position around the chimney. The dead air space around the chimney is to be considered important as the same affords a protection for the chicks.

The construction and advantages of the improvement will, it is thought, be apparent to those skilled in the art to which such invention relates so that further detailed description will not be required.

Having described the invention, I claim:—

1. A hover comprising a downwardly slanting canopy having an opening in its top, a downwardly slanting casing in the canopy, a chimney centrally fixed in the casing and projecting therebelow and designed to enclose a heater in the bottom thereof, a baffle plate between the chimney and the open top of the hood and means adjustably connecting the casing with the canopy for regulating the position of the top of the chimney with respect to the baffle plate.

2. A hover comprising a downwardly slanting canopy having an opening in its top, a downwardly slanting casing in the canopy having a closed bottom, a chimney centrally fixed in the casing and projecting through the bottom thereof and designed to enclose a heater in the bottom thereof, a baffle plate between the chimney and the open top of the hood and means adjustably connecting the casing with the canopy for regulating the position of the top of the chimney with respect to the baffle plate and for likewise regulating the breadth of the flues and the body of the casing with respect to the lower edge of the canopy.

3. A hover comprising a downwardly slanting canopy having an opening in its top, a downwardly slanting casing in the canopy, a chimney centrally fixed in the casing and projecting therebelow and designed to enclose a heater in the bottom thereof, pairs of spaced plates fixed respectively to the canopy and casing, means adjustably connecting the pairs of lapping plates for adjusting the casing with respect to the canopy and said pairs of plates providing therebetween separate flues for the heat passing from the chimney between the canopy and casing.

In testimony whereof I affix my signature.

EDWIN F. PAUL.